(12) United States Patent
Le Perchec

(10) Patent No.: US 12,449,355 B2
(45) Date of Patent: Oct. 21, 2025

(54) DEVICE FOR MEASURING THE REFRACTIVE INDEX OF A FLUID

(71) Applicant: COMMISSARIAT A L'ENERGIE ATOMIQUE ET AUX ENERGIES ALTERNATIVES, Paris (FR)

(72) Inventor: Jerome Le Perchec, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/984,964

(22) Filed: Dec. 17, 2024

(65) Prior Publication Data

US 2025/0198921 A1 Jun. 19, 2025

(30) Foreign Application Priority Data

Dec. 18, 2023 (FR) ...................................... 2314430

(51) Int. Cl.
*G01N 21/41* (2006.01)
*G01N 21/45* (2006.01)

(52) U.S. Cl.
CPC ......... *G01N 21/4133* (2013.01); *G01N 21/45* (2013.01); *G01N 2021/451* (2013.01)

(58) Field of Classification Search
CPC ............... G01N 21/4133; G01N 21/45; G01N 2021/451
USPC ....................................................... 356/128
See application file for complete search history.

(56) References Cited

U.S. PATENT DOCUMENTS

| 7,355,162 B2 * | 4/2008 | Sidorin ..................... G01J 3/02 385/37 |
| 2009/0153844 A1 | 6/2009 | Peter et al. |
| 2015/0009508 A1 * | 1/2015 | Bachmann .............. H01S 5/141 356/479 |
| 2022/0317031 A1 | 10/2022 | Dupoy et al. |

FOREIGN PATENT DOCUMENTS

| EP | 3 023 767 A1 | 5/2016 |
| KR | 2011 0031766 A | 3/2011 |

OTHER PUBLICATIONS

French Search Report issued in French Patent Application No. 2314430, dated Jun. 20, 2024, (w/ English Translation).

* cited by examiner

*Primary Examiner* — Md M Rahman
(74) *Attorney, Agent, or Firm* — Oblon, McClelland, Maier & Neustadt, L.L.P.

(57) ABSTRACT

The invention relates to a sensor, including:
a planar entry guide comprising a first exit face and a planar transmission exit guide comprising a second entry face,
a Fabry-Pérot cavity configured to accommodate a fluid, and delimited by the first exit face of the planar entry guide and by the second entry face of the planar transmission exit guide,
a planar reflection exit guide optically coupled to the planar entry guide by the Fabry-Pérot cavity, including an optical axis at the first face forming an acute opening angle with an optical axis at the first face of the planar entry guide,
the Fabry-Pérot being arranged so that a normal to the first face constitutes a bisector of the opening angle.

18 Claims, 5 Drawing Sheets

DEVICE FOR MEASURING THE REFRACTIVE INDEX OF A FLUID

TECHNICAL FIELD

The field of the invention is that of integrated devices for measuring the refractive index of a fluid, such as for example a liquid or a gas. More particularly, the invention relates to the detection by refractometry of an analyte in a fluid, and optionally the measurement of a concentration of this analyte in the fluid.

PRIOR ART

There are numerous techniques for measuring the refractive index of a fluid such as a liquid or a gas. Some have led to the production of integrated refractometers, i.e. they include microscope, optical and optionally electronic components, implemented on a substrate. The components may for example be waveguides, couplers, interferometers, resonant rings, photonic crystals, photodetectors or lasers. These refractometers are particularly interesting for producing biosensors. The latter are used for numerous applications, for example in the surveillance, environmental or food-security field, or in clinical diagnostics. Document "Optical biosensors based on refractometric sensing schemes: A review", Yangyang Chen et al., Biosensors and Bioelectronics, volume 144 (2019) 111693, reviews the advances in the field of optical biosensors based on a principle of detection by refractometry, and discusses more particularly opportunities for integration on a substrate and miniaturization of these biosensors.

Among the techniques cited, a biosensor using a Mach-Zehnder interferometer is described. An incident monochromatic light mode is separated into two light modes produced by a Y junction, each circulating in an arm of the Mach-Zehnder interferometer, including a measuring branch. The measuring arm, in contact with a fluid, incorporates a biorecognition element, which may be a biological material (for example enzymes, antibodies, nucleic acids, cell receptors, microorganisms, tissues, organites or other natural products), a biomimetic material (for example a printed polymer, a biomimetic catalyst, synthetic receptors or combinatory ligands) or derived biological material (for example functional nucleic acids, recombinant microorganisms, modified proteins).

In operation, the biorecognition element interacts with an analyte of interest contained in the fluid, to fix it on a wall of the measuring arm. Thus the effective index seen by the light mode produced circulating in the measuring arm is modified and a phase shift is created between this light mode and the light mode produced circulating in the other arm, referred to as the reference arm. The phase difference is converted into a change in light power at the exit of the Mach-Zehnder interferometer. A calculation then makes it possible to refer the variation in light power detected to the variation in the effective index and next to the index of the medium interacting with the evanescence part of the light mode produced circulating in the measuring arm.

Other interferometric techniques based on waveguides, such as for example those using resonant rings, have the common principle of exploiting a variation in effective index of a guided optical mode. Therefore, they have the drawback of being sensitive only to a variation in refractive index of a surface region of the surrounding medium that interacts with an evanescent part of the guided mode, and therefore very close to the associated waveguide. To increase the sensitivity of detection, it is therefore necessary to have recourse to an adapted biorecognition element, as explained above. It is consequently also necessary to make the fluid flow for the time that the analyte of interest interacts with the biorecognition element, typically between 30 seconds and one minute. The measurement can therefore not be instantaneous. In addition, it may be disturbed by the presence of bubbles on the surface of the waveguide and it results from a complex calculatory processing.

DISCLOSURE OF THE INVENTION

The objective of the invention is to at least partly remedy the drawbacks of the prior art, and more particularly to propose an integrated sensor and refractometer making it possible to measure a mean refractive index and/or a mean absorption of a volume of fluid using a simplified signal processing. The measurement it is also instantaneous, is not disturbed by the presence of bubbles in the fluid, and does not require a flow of the fluid. The fluid may be a gas or a liquid.

For this purpose, the object of the invention is a sensor, including a planar entry guide comprising a first exit face and a planar transmission exit guide comprising a second entry face. The sensor furthermore includes a Fabry-Pérot cavity configured to accommodate a fluid, and delimited by the first exit face of the planar entry guide and by the second entry face of the planar transmission exit guide. The sensor includes a planar reflection exit guide optically coupled to the planar entry guide by the Fabry-Pérot cavity, including an optical axis at the first face forming an acute opening angle with an optical axis at the first face of the planar entry guide. The Fabry-Pérot being arranged so that a normal to the first face constitutes a bisector of the opening angle.

Certain preferred but non-limitative aspects of this sensor are as follows.

The planar transmission exit guide can have an optical axis at the second face parallel to the optical axis of the planar entry guide, The optical axis of the planar transmission exit guide can be contained in the same open half-plane delimited by the optical axis of the planar entry guide as the planar reflection exit guide.

The planar transmission and reflection exit guides can each be coupled to a coupling grating.

The sensor can furthermore comprise an absorbent wall between the planar transmission and reflection exit guides.

The first and/or second face can incorporate a biorecognition element.

The invention also relates to a refractometer including a power divider, and a first group of sensors according to any one of the above characteristics, optically coupled to the power divider. At least one sensor may have its opening angle or a width of the Fabry-Pérot cavity different respectively from the opening angle or from a width of the Fabry-Pérot cavity of another sensor.

The sensors in the first group can have equal opening angles, and different widths of Fabry-Pérot cavity selected from an ordered set of distinct values.

The sensors in the first group can have Fabry-Pérot cavities with the same width, and different opening angles selected from an ordered set of distinct values.

The refractometer can furthermore include a housing comprising a microfluidic channel of interest communicating with the Fabry-Pérot cavities of the sensors in the first group.

The refractometer can furthermore comprise a second group of sensors optically coupled to the power divider, each sensor in the second group being identical to a sensor in the first group.

The housing can furthermore comprise a reference microfluidic channel communicating with the Fabry-Pérot cavities of the sensors in the second group.

The planar entry, transmission exit and reflection exit guides can be made from a common material.

The refractometer can furthermore comprise an exit channel optically coupled to each planar transmission exit guide and to each planar reflection exit guide, the exit channels being able to have aligned ends.

The invention also relates to a use of a refractometer according to any one of the above characteristics, for measuring a refractive index and/or an absorption of a fluid of interest, by means of a light source optically coupled to an entry of the power divider.

For this use the planar entry guides can have the same width. The ordered set can at least partly cover the range lying between $1.8*\theta c$ and $2.0*\theta c$, where $\theta c$ is the minimum total reflection angle of the first faces of the planar entry guides.

The width of the Fabry-Pérot cavities can be such that a transmitted light flow coming from the light source has an intensity in a planar transmission exit guide of a sensor the opening angle of which is not equal to one of the bounds of the ordered set of values, strictly greater than its intensity in all the planar transmission exit guides of the other sensors.

The measurement of the refractive index of the fluid of interest can result from noting a difference in the position of a maximum and/or minimum intensity or intensity contrast between the exit channels of the first group and the exit channels of the second group.

BRIEF DESCRIPTION OF THE DRAWINGS

Other aspects, aims, advantages and features of the invention will appear better upon reading the following detailed description of preferred embodiments thereof, given as a non-limiting example, and made with reference to the appended drawings wherein.

DETAILED DISCLOSURE OF PARTICULAR EMBODIMENTS

Figure 1:
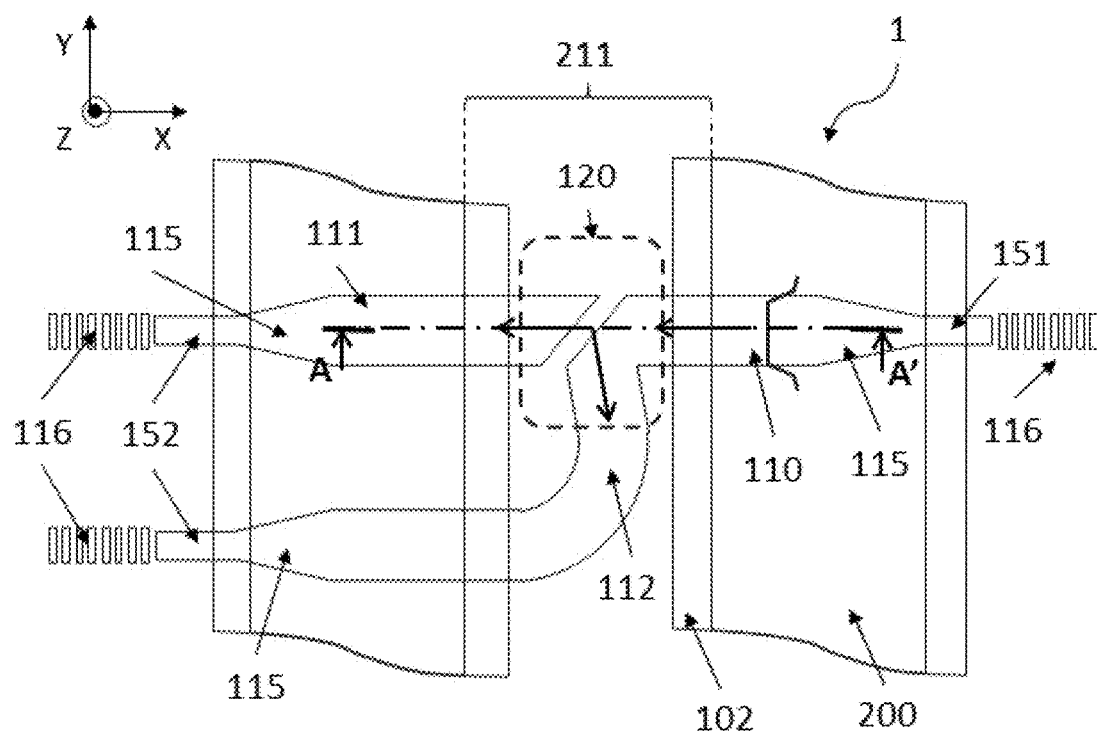
FIG. 1 is a schematic view in longitudinal section along a plane CC' of an example of a sensor.

In the figures and in the following description, the same references represent identical or similar elements. In addition, the different elements are not plotted to scale so as to favor clarity of the figures. Moreover, the different embodiments and variants are not exclusive of one another and could be combined together. Unless stated otherwise, the terms "substantially", "about", "in the range of" mean within a 10% margin, and preferably within a 5% margin. Moreover, the terms "comprised between . . . and . . . " and the like mean that the bounds are not included, unless stated otherwise. Finally, unless mentioned to the contrary, when a first element rests on a second element, the first element is preferably in physical contact with the first element.

The invention relates to a sensor and a refractometer comprising the sensor. Said sensor includes a Fabry-Pérot cavity configured to accommodate a fluid, a planar entry guide, a planar transmission exit guide and a planar reflection exit guide. The planar entry guide is optically coupled to the planar transmission and reflection exit guides by the Fabry-Pérot cavity. The Fabry-Pérot cavity is delimited by a first face and a second face. The first face is an exit of the planar entry guide and an entry of the planar reflection exit guide. The second face is an entry of the planar transmission exit guide.

The optical axes of the planar entry guide and of the planar reflection exit guide form an angle at the first face, referred to as the opening angle. A normal to the first face is a bisector of the opening angle. Thus, in operation, an incoming optical mode propagates in the planar entry guide. It is divided by the sensor into a plurality of parts, a transmitted part of which propagates in the planar transmission exit guide, a reflected part of which propagates in the planar reflection exit guide and a part of which is absorbed by the fluid. The intensity ratio between the transmitted part and the reflected part depends on the mean complex optical index of the volume of fluid contained by the Fabry-Pérot cavity.

The opening angle is such that the optical axis of the planar entry guide forms an angle $\theta$ with the normal to the first face. This angle $\theta$ is smaller than the critical angle $\theta c$ beyond which a mode guided by the planar entry guide is completely reflected on the first face. Advantageously, the planar entry guide and the planar transmission and reflection exit guides are made from the same material and the opening angle is preferably greater than or equal to 180% of $\theta c$. Thus the reflectance of the faces and the fineness of the Fabry-Pérot cavity are increased, at the same time as the loss of coupling between the planar entry guide and the planar reflection exit guide is reduced. Preferably, the width of the Fabry-Pérot cavity is selected so as to maximize the intensity ratio between the transmitted part and reflected part.

The refractometer of the invention includes a power divider and a first group of sensors optically coupled to the power divider. Preferably, the Fabry-Pérot cavities of the sensors all have the same width and the opening angles of the sensors take distinct values. Thus, when the power divider is illuminated by a light source, for example an LED, it is possible to determine the refractive index of the fluid by comparison with a reference of the transmitted and reflected parts coming from various sensors. A similar result can be obtained with a first group of sensors such that the Fabry-Pérot cavities of the sensors have distinct widths and identical opening angles.

Throughout the description, two optical components, such as for example waveguides, are said to be "optically coupled" if an optical mode can propagate at least partly in the two optical components, optionally via intermediate optical components. The coupling can be done in various ways, for example via a direct coupling, a diffraction grating, or an adiabatic or evanescent or directional coupling.

Throughout the description, a planar waveguide is a waveguide extending in one plane. It consists of a core that is surrounded by a sheath. The sheath can comprise a fluid. The planar guide can be in a ridge or in a strip. When it is in a ridge, the core is formed by a narrow part extending on a base with planar faces and parallel to the plane, so that a cross-section of the core at any point on the planar waveguide has a T shape. When it is in a strip, it has no base, so that a cross-section of the core, that of the narrow part, is substantially rectangular in shape. A refractive index of the core is strictly greater than a refractive index of the sheath. The planar waveguide extends along an optical axis. At every point on the optical axis, the narrow part has a width orthogonal to the optical axis and parallel to the plane, at least 10 times greater than its thickness of the core measured in a direction orthogonal to the plane. The planar guide is monomode or at least provided with a means for exciting solely a fundamental mode of the planar guide. The thickness of the core can be between 100 nm and 800 nm, for example equal to 300 nm or 500 nm. The width of the narrow part can be between 1 µm and 90 µm. When the planar guide is monomode, the thickness of the core h satisfies the relationship $$\frac{2h}{\lambda}\sqrt{n_2^2 - n_1^2} < 1,$$

where $n_1$ is the refractive index of the sheath, $n_2$ is the refractive index of the core and $\lambda$ is the wavelength of the mode guided by the planar guide.

The complex refractive index, also called the complex optical index, is a dimensionless number that characterizes the optical properties of a medium, in particular the absorption and diffusion. The refractive index is equal to the real part of the complex refractive index. The coefficient of extinction, also called the coefficient of attenuation, of a material measures the loss of energy of an electromagnetic radiation passing through this material. The coefficient of extinction is equal to the imaginary part of the complex refractive index.

The invention will be best understood in the light of following particular embodiments described in relation to a sensor or a refractometer including a Fabry-Pérot interferometer.

FIG. 1 is a schematic plan view of an example of a sensor 1 according to the invention. The sensor 1 includes a Fabry-Pérot interferometer 120. The Fabry-Pérot interferometer 120 comprises a planar entry guide 110, a planar transmission exit guide 111 and a planar reflection exit guide 112, all three extending on a substrate 100.

The substrate 100 includes a front face and a rear face parallel and opposite to the front face and to the planar guides. It comes for example, after any cropping, from a disk-shaped plate with a diameter of 100 mm, 150 mm, 200 mm or 300 mm, for example made from silicon. If it has not been thinned, it typically has a thickness of a few hundreds of a micron, example equal to 525 µm, 675 µm, 725 µm or 775 µm.

A direct orthogonal three-dimensional reference frame (X, Y, Z) is defined here and for the remainder of the description, where the X and Y axes form a plane parallel to the front face of the substrate 100, and where the Z axis is oriented from the rear face towards the front face. In the remainder of the description, the terms "vertical" and "vertically" should be understood as relating to an orientation substantially parallel to the Z axis, and the terms "horizontal" and "horizontally" as relating to an orientation substantially parallel to the plane (X, Y). Moreover, the terms "lower" and "upper" should be understood as relating to an increasing positioning on moving away from the substrate 100 in the direction +Z. The term "lateral" applied to a plane, a face or a surface characterizes an orientation orthogonal to the plane (X, Y) respectively of the plane, of the face or of the surface.

Throughout the description, the waveguides extend parallel to the front face of the substrate 100 and therefore parallel to the plane (X, Y). The optical axis of a waveguide is locally parallel to the direction along which the light is guided in the waveguide. It is generally an axis of symmetry of the waveguide and can be determined by simulation. Unless mentioned to the contrary, the width of a waveguide is measured at the optical axis, orthogonally thereto and parallel to the front face of the substrate 100.

The planar entry guide 110 extends parallel to the front face of the substrate 100 from a first lateral face 121a of the planar entry guide 110. The first face 121a is planar and substantially orthogonal to the front face of the substrate 100.

The planar reflection exit guide 112 extends parallel to the front face of the substrate 100. The first face 121a of the planar entry guide 110 is also a lateral face of the planar reflection exit guide 112, i.e. the planar entry guide 110 and the planar reflection exit guide 112 have a common region.

The planar entry guide 110 has an optical axis at the first face 121a forming an angle, referred to as the opening angle, with an optical axis of the planar reflection exit guide 112 at the first face 121a. The optical axes of the planar entry guide 110 and of the planar reflection exit guide 112 intersect at a point M located in the vicinity of the first face 121a, preferentially on the first face 121a. The normal to the first face 121a passing through the point M is a bisector of the opening angle. The optical axis of the planar entry guide 110 forms an oriented acute angle θi with the normal to the first face 121a. Consequently, the opening angle is equal to 2θi.

The planar transmission exit guide 111 extends parallel to the front face of the substrate 100 from a second lateral face 121b of the planar transmission exit guide 111. The second face 121b is planar and substantially orthogonal to the front face of the substrate 100 and substantially parallel to the first face 121a. Thus the first and second faces 121a, 121b define together a Fabry-Pérot cavity 121. The first and/or second face 121a, 121b can incorporate a biorecognition element, for example able to fix the allergen on one of the two faces. The Fabry-Pérot cavity 121 can also contain a porous dielectric material, for example a porous silicon oxide. The porous dielectric material can then incorporate a biorecognition element.

Figure 2:
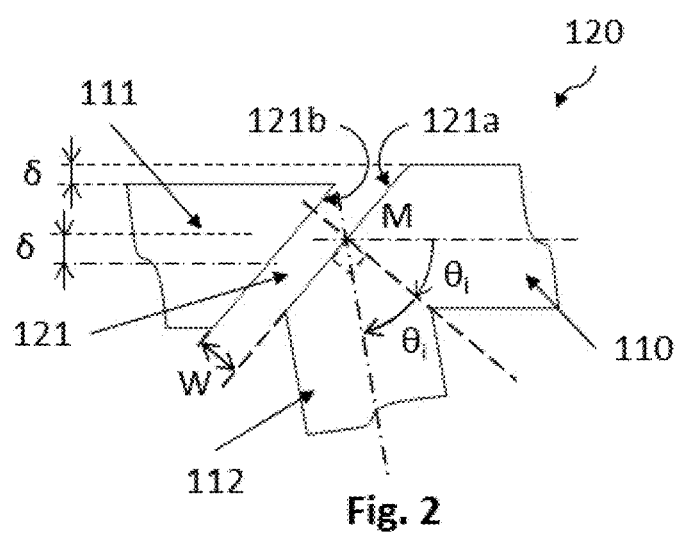
FIG. 2 is a plan view of an example of a Fabry-Pérot interferometer used in the invention.

The planar transmission exit guide 111 advantageously has an optical axis at the second face 121b parallel to the optical axis of the planar entry guide 110. Preferentially, the width of the planar entry guide 110 and of the planar reflection exit guide 112, outside the common region, measured approximately from the first face 121a, are equal to the width of the planar transmission exit guide 111 at the second face 121b, as shown in FIG. 2.

The optical axis of the planar entry guide 110 at the first face 121a defines two open half-planes not including it. Advantageously, the optical axis of the planar transmission exit guide 111 is offset by a distance δ with respect to the optical axis of the planar entry guide 110 to compensate for a difference caused by a phenomenon of refraction on passing through the planar diopters defined by the first and second faces 121a, 121b. It is therefore offset so that it belongs to the same open half-plane as the planar reflection exit guide 112. Thus a loss of coupling between the planar entry guide 110 and the planar transmission exit guide 111 is minimized.

Figure 4A:
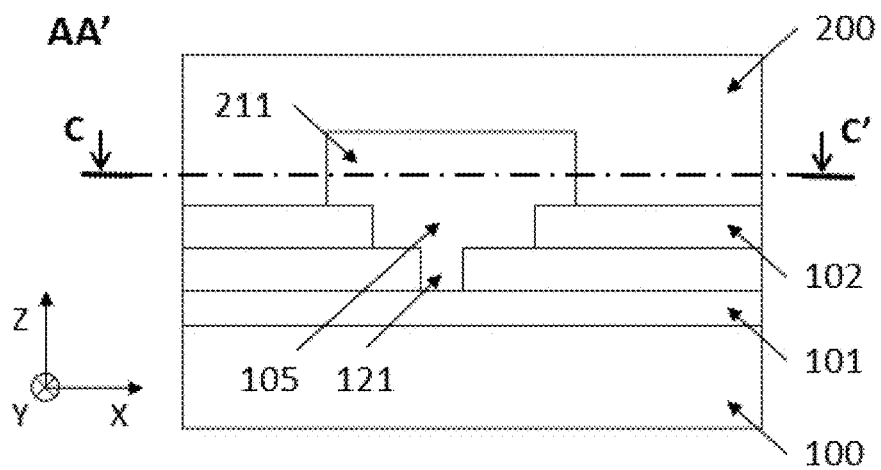
FIG. 4A is a schematic view in cross section along a plane AA' of the example of a sensor and of the example of a refractometer.

In this example, as shown on FIG. 4A, an encapsulation sublayer 101 rests on the front face of the substrate 100, and the planar entry, transmission exit and reflection exit guides 110, 111, 112 are in contact with the encapsulation sublayer 101. The encapsulation sublayer 101 has a refractive index strictly lower than the smallest of the refractive indices of the planar entry, transmission exit and reflection exit guides 110, 111, 112. The encapsulation sublayer 101 is typically a dielectric layer, for example a silicon oxide. The thickness of the encapsulation sublayer 101 along the Z axis is sufficient for an optical mode guided by the planar entry, transmission exit and reflection exit guides 110, 111, 112 not to leak into the substrate 100.

A structured encapsulation layer 102 is in contact with the encapsulation sublayer 101 and covers the planar entry, transmission exit and reflection exit guides 110, 111, 112 so as to be in contact with them. It has a refractive index strictly lower than the smallest of the refractive indices of the planar entry, transmission exit and reflection exit guides 110, 111, 112. The structured encapsulation layer 102 can be made from the same material as the encapsulation sublayer 101. It is typically a dielectric layer, for example a silicon oxide.

The structured encapsulation layer 102 includes a through opening exposing the Fabry-Pérot cavity 121, i.e. the through opening delimits a volume that occupies at least a part of the parallelepiped defined by the first and second faces 121a, 121b, preferentially the entire volume. Consequently, the through opening defines a window 105 through which a fluid accesses the Fabry-Pérot cavity 121, and in this regard the Fabry-Pérot cavity 121 is configured to accept the fluid. In the case where the Fabry-Pérot cavity 121 contains a porous dielectric material, the fluid accesses the Fabry-Pérot cavity 121 and penetrates the porous dielectric material. The refractive indices of the planar entry guide 110 and of the planar transmission and reflection exit guides 111, 112 are strictly higher than the refractive index of the fluid. The planar entry and transmission and reflection exit guides 110, 111, 112 can be made from a dielectric material, for example from silicon nitride.

For example, the fluid accesses the Fabry-Pérot cavity 121 via a microfluidic channel 211. The microfluidic channel 211 is a trench, here rectilinear, formed in a housing 200. The trench extends in depth from a bearing face of the housing 200. The housing 200 can be made from glass or from a polymer. The microfluidic channel 211 has a bottom parallel to the bearing surface, and two lateral walls substantially orthogonal to the bottom. It has for example a width, measured orthogonally to the lateral faces, of 0.5 mm. The bearing surface of the housing 200 rests on the structured encapsulation layer 102. The housing 200 is disposed so that the bottom of the microfluidic channel 211 faces the window 105 and the Fabry-Pérot cavity 121. Thus the microfluidic channel 211 communicates with the Fabry-Pérot cavity 121.

The sensor 1 includes two exit channels 152 and one entry channel 151. The entry and exit channels 151, 152 are waveguides, for example monomode. The planar entry guide 110 is optically coupled to the entry channel 151, optionally via a mode adaptation region 115. The planar transmission and reflection exit guides 111, 112 are each optically coupled to an exit channel 152, optionally via a mode adaptation region 115. Each mode adaptation region 115 is here a region of a waveguide in direct coupling with the planar guides and the entry/exit channels, the width of which varies gradually along its optical axis.

In this example, the planar reflection exit guide 112 includes a bend inside which the optical axis of the planar reflection exit guide 112 has a form substantially in an arc of a circle, with a radius of curvature sufficiently large to guide the light. The length of the arc of a circle is such that the exit channels 152 are parallel to each other. Alternatively, the planar reflection exit guide 112 is rectilinear and the exit channel 152 optically coupled to the planar reflection exit guide 112 includes the bend, for the same purpose.

When the exit channels 152 are parallel to each other, a separating wall (not shown) can be interposed between the planar transmission exit guide 111 and the planar reflection exit guide 112 and/or between the exit channels 152 coupled to the planar entry guide 110 and to the planar reflection exit guide 112. The separating wall can be made from a material absorbing or reflecting light at an operating wavelength of the sensor 1. The separating wall can for example be made from TiN. Thus it is possible to bring the exit channels and the planar exit guides close together without risking optical coupling between them. The sensor 1 is then more compact.

The exit channels 152 are each optically coupled to an optional coupling grating 116, able to extract an optical mode guided by the exit channels 152. Thus it is possible to view or measure a difference in intensity or an intensity ratio between a transmitted part propagating in the planar transmission exit guide 111 and a reflected part propagating in the planar reflection exit guide 112 of an optical mode guided by the planar entry guide 110.

Here, the entry channel 151, the exit channels 152, the mode adaptation regions 115 and the coupling gratings 116 rest on the encapsulation sublayer 101, and can, at least partly, not be covered by the structured encapsulation layer 102.

Figure 3:
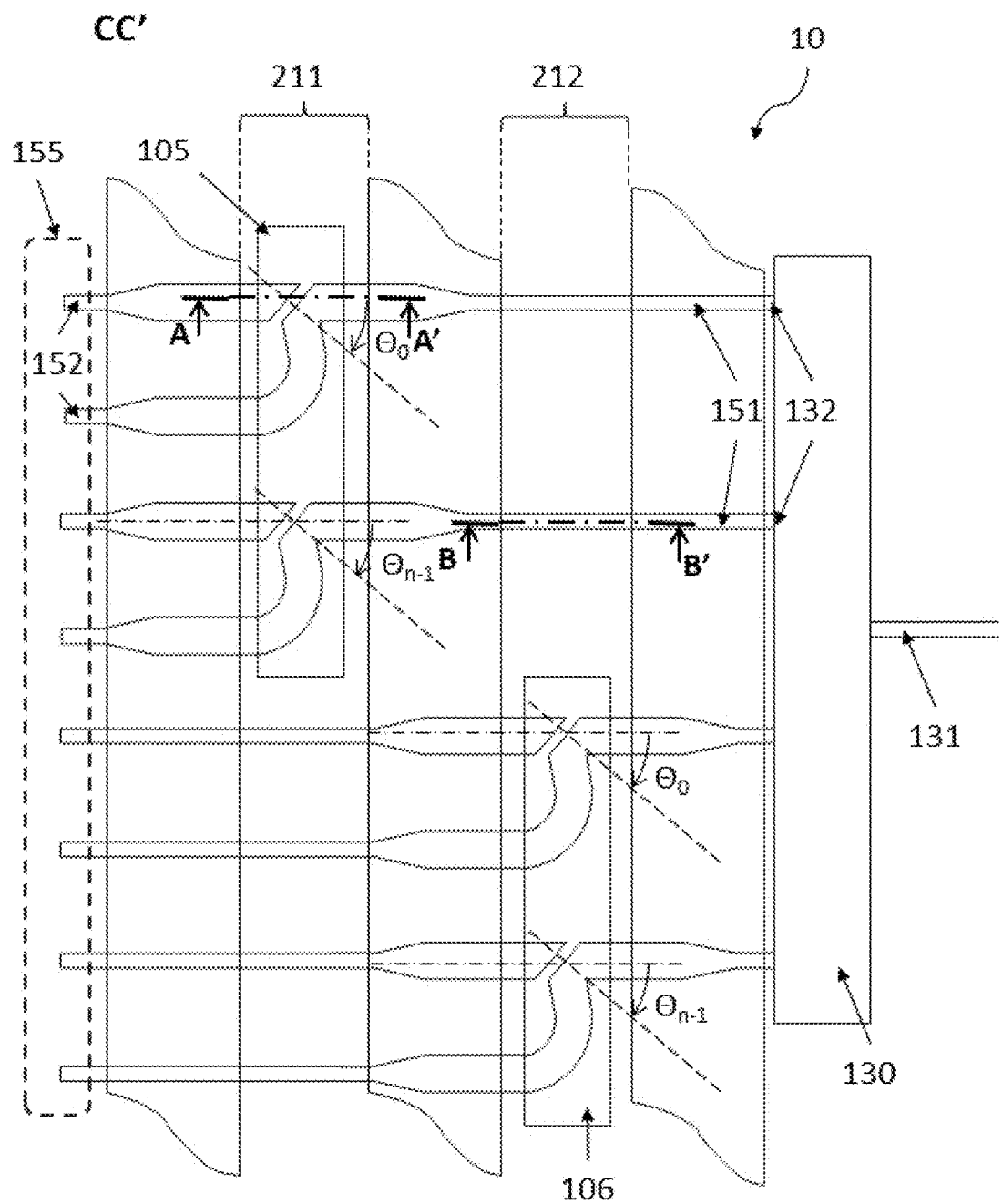
FIG. 3 is a schematic view in longitudinal section along a plane CC' of an example of a refractometer.
Figure 4B:
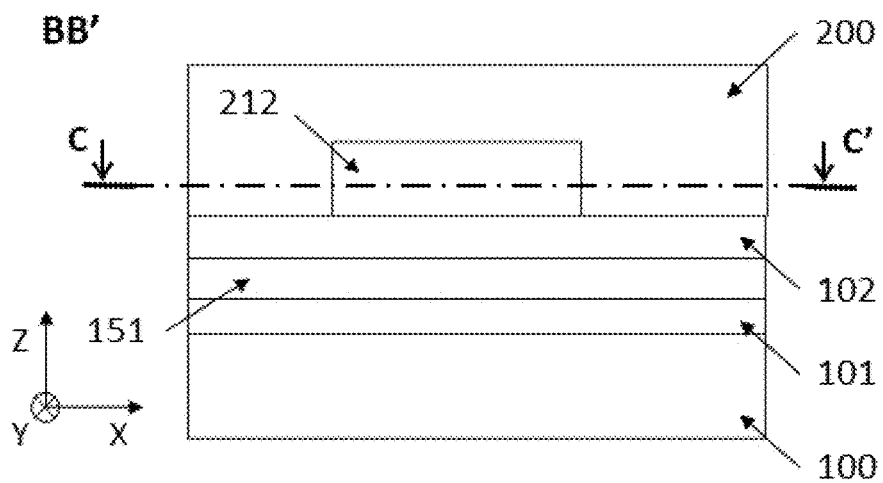
FIG. 4B is a schematic view in cross section along a plane BB' of the example of a refractometer.

An example of embodiment of a refractometer 10 will now be described in relation to FIGS. 3, 4A and 4B. FIG. 3 is a plan view of the refractometer 10 along a cutting plane C-C' marked on FIGS. 4A and 4B. FIG. 4A is a view in cross section along a cutting plane A-A' marked on FIG. 3. FIG. 4B is a view in cross section along a cutting plane B-B' marked on FIG. 3.

The refractometer 10 comprises a first group of n sensors 1, numbered from 0 to n−1, n being an integer greater than or equal to 2, preferentially greater than or equal to 10, or even greater than or equal to 20 or 30. The sensors 1 in the first group are identical to the one described in relation to FIGS. 1 and 2.

In this example, the refractometer 10 includes an optional second group of n reference sensors 1, numbered from 0 to n−1. The Fabry-Pérot interferometer 120 of each sensor 1 in the second group is identical to the Fabry-Pérot interferometer 120 of the sensor 1 of the same rank in the first group.

The refractometer 10 furthermore includes a power divider 130. The power divider 130 comprises an input 131 and 2n outputs 132. The entry channel 151 of each sensor 1 in the first and second groups of sensors is optically coupled to a distinct output 132 of the power divider 130. The power divider 130 can for example comprise a set of Y junctions and/or multimode interferometers. It is able to divide the power of an incoming light flow 131 in equal parts on the outputs 132 optically coupled to the first group of sensors 1 and, where applicable, in equal parts on the outputs 132 optically coupled to the second group of sensors 1, advantageously in equal parts on the 2n outputs 132. The light flow can come from a laser or a light-emitting diode, the latter being more economical.

The sensors 1 in the first group share a common microfluidic channel 211 and, advantageously, a common window 105, as shown in FIG. 3 and FIG. 4A. The sensors 1 in the second group also share a common microfluidic channel 212 and, advantageously, a common window 106. In the description, the window 105 and the microfluidic channel 211 both common to the first group are termed of "interest". They are respectively distinct from the window 106 and from the microfluidic channel 212 both common to the second group. In the description, the window 106 and the microfluidic channel 212 both common to the second group are termed "reference". The sensors 1 in each group are disposed in order of rank along the microfluidic channels of interest and reference microfluidic channels 211, 212.

Here, the microfluidic channel of interest 211 is extended over a region of the structured encapsulation layer 102 covering the sensors 1 in the second group, i.e. the microfluidic channel of interest 211 is separated from the sensor 1 in the second group in the Z direction by the structured encapsulation layer 102. Likewise, the reference microfluidic channel 212 is extended over a region of the structured encapsulation layer 102 covering the sensors 1 in the first group (FIG. 4B).

Each sensor 1 of rank i has, by definition, an opening angle equal to 2θi. In this example, the θi are regularly spaced, i.e. $(\theta_{i+1}-\theta_i)=(\theta_1-\theta_0)$ for every i belonging to $\{1, \ldots, n-2\}$. The Fabry-Pérot cavities 121 of all the sensors 1 have the same width W, measured orthogonally to the first and second faces 121a, 121b.

Alternatively, all the sensors can have the same opening angle and widths Wi of Fabry-Pérot cavities 121 that are regularly spaced. For example, for every i belonging to $\{1, \ldots, n-2\}$, there can be the equation $(W_{i+1}-W_i)=(W_1-W_0)$.

The refractometer 10 includes a refractometer output 155. The latter comprises ends of the exit channels 152 of the sensors 1 in the first group and, where applicable, ends of the exit channels 152 of the sensors 1 in the second group. Each end is able to extract at least part of a light flow guided by the corresponding exit channel 152. The ends can for example be coupling gratings 116 or a cross-section of the exit channel 152. Here, all the ends are aligned and all the exit channels 152 are parallel. The refractometer output 155 can be inspected by the naked eye if the light flow lies in the range of visible wavelengths. Independently of the spectral range of the light flow, the refractometer output 155 can be inspected by any type of means for detecting the light flow, such as photodiodes or a matrix sensor.

An example of use of the sensor 1and of the refractometer 10 will now be described, taking FIGS. 5A and 5B as support.

Figure 5A:
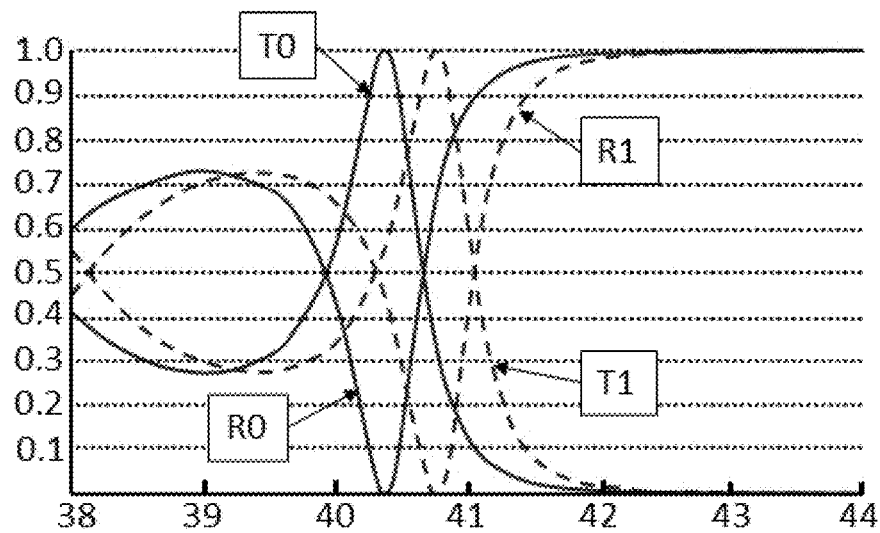
FIG. 5A is a result of simulating a light flow transmitted and reflected by the Fabry-Pérot interferometer in the presence of two liquids with different refractive indices.
Figure 5B:
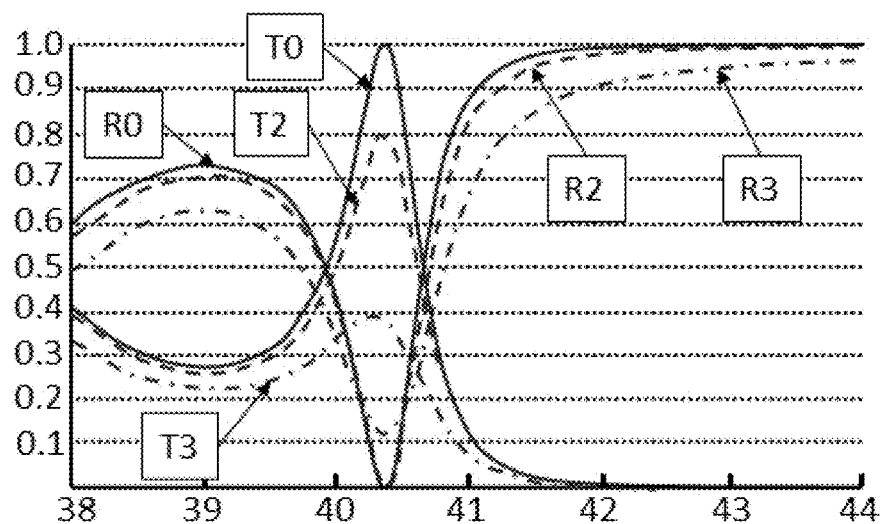
FIG. 5B is a result of simulating a light flow transmitted and reflected by the Fabry-Pérot interferometer in the presence of three liquids with different absorptions.

FIGS. 5A and 5B are results of simulation giving the standardized intensity of a transmitted part T0, T1, T2, T3 propagating in the planar transmission exit guide 111 and of a reflected part R0, R1, R2, R3 propagating in the planar reflection exit guide 112 of an optical mode propagating in the planar entry guide 110 of a sensor 1 as described in relation to FIG. 1. The standardized intensity (Y axis) is given as a function of the opening half-angle θi in degrees (X axis).

The wavelength of an optical mode is equal to 750 nm. The planar entry, transmission exit and reflection exit guides 110, 111, 112 are made from silicon nitride. The Fabry-Pérot cavity 121 has a width measured perpendicularly to the first face 121a equal to 1.25 μm.

The curves T0 and R0 are obtained with the Fabry-Pérot cavity 121 filled with pure water. The curves T1 and R1 are obtained with the Fabry-Pérot cavity 121 filled with water with a concentration of analyte added, causing a variation in refractive index equal to 0.01 with respect to the refractive index of pure water.

Thus, for example, with a sensor 1 configured to have an opening half-angle equal to 40.35 degrees (corresponding to a maximum of transmitted part and a minimum of reflected part in the presence of pure water), an addition of analyte corresponding to a variation in refractive index of 0.01 changes the difference in intensities of the transmitted and reflected parts from 1 to 0, and the ratio from infinity to 1. A detection or a measurement of a concentration of analyte can also be done with any other sensor 1 the opening angle of which makes it possible to measure/view a variation in intensity of the transmitted and/or reflected part as a function of the concentration of analyte.

The curves T2 and R2 (and respectively T3 and R3) are obtained with the Fabry-Pérot cavity 121 filled with a fluid causing a variation in the imaginary part of the complex optical index equal to 0.001 (and respectively 0.005) with respect to the imaginary part of the refractive index of pure water.

Thus, for example, with a sensor 1 configured to have an opening half-angle equal to 40.35 degrees, varying the imaginary part of the refractive index of the fluid contained in the Fabry-Pérot cavity 121 varies the intensities of the reflected and transmitted parts. A variation in absorption of the fluid can then be detected or measured. The same applies with other values of opening angles.

In order to decorrelate a variation of the real part from a variation of the imaginary part of the refractive index of a fluid of interest with respect to a reference fluid, it is advantageous to use a refractometer 10 is described in relation to FIG. 3.

In operation, a light source with a mean wavelength λ, such as a laser or advantageously a light-emitting diode, is optically coupled to the input of the power divider 130 so that an incoming guided mode, of transverse electric (TE) or magnetic (TM) polarization, propagates in the entry of the power divider 130. The fluid of interest (and respectively reference fluid) fills the microfluidic channel of interest 211 (and respectively the microfluidic reference channel 212) and the Fabry-Pérot cavities 121 of the sensors 1 in the first group (and respectively the second group).

The power divider 130 produces an emerging guided mode resulting from the incoming guided mode in each output of the power divider 130. Each emerging guided mode produces a sensor guided mode propagating in the planar entry guide 110, a transmitted guided mode propagating in the planar transmission exit guide 111 and a reflected guided mode propagating in the planar reflection exit guide 112, of the corresponding sensor 1. All the transmitted guided modes of the sensors 1 in the first group of sensors (and respectively of the second group of sensors) constitutes a transmitted light flow of the first group (and respectively of the second group), and all the reflected guided modes of the first group of sensors (and respectively of the same group of sensors) constitutes a reflected light mode of the first group (and respectively of the second group). The intensity of the transmitted light flow (or respectively reflection light flow) in a planar transmission exit guide 111 (or respectively planar reflection exit guide 112) is equal to the intensity of the transmitted (or respectively reflected) guided mode in this planar guide.

Preferably, the planar entry guides 110 have the same width, and the opening half-angles θi are selected so as to sample the X axis in FIGS. 5A and 5B. That is to say the opening half-angles θi cover, at least partly, the range of angles lying between 0.9*θc and θc, where θc is the minimum angle such that the sensor guided mode of any sensor with an opening half-angle θ greater than or equal to θc is totally reflected on the first face 121a. θc is the minimum total deflection angle of the first faces 121a of the planar entry guides 110 of all the sensors. This angle depends on the refractive indices of the Fabry-Pérot cavity 121 and of the planar entry guide 110, as well as on the geometry of the first face 121a. It can be determined by simulating a guided mode in the fictitious planar entry guide with the same width and nature as the planar entry guide 110, for several orientations of the first face of the fictitious planar entry guide. For a planar diopter, $\theta_0 = \arcsin\left(\frac{n_1}{n_2}\right)$, where n1 is equal to the real part of the refractive index of the reference fluid and n2 is equal to the real part the refractive indices of the entry, transmission exit and reflection exit guides 110, 111, 112. Thus the reflectance of the first and second faces 121a and 121b and the finenesses of the Fabry-Pérot cavities are maximized, at the same time as the losses of coupling between the planar entry guides and the planar reflection exit guides are reduced.

The width W of the sensors 1 is preferably such that, for a real θ lying in the range of angles, and for a positive non-zero integer p, there is the equation:

$$\sin(\theta) = \frac{n_1}{n_2}\sqrt{1 - \left(\frac{p\lambda}{2Wn_1}\right)^2}.$$

Preferably, p is equal to 1. Thus the Fabry-Pérot cavities 121 operate close to a resonance.

At the output of the refractometer 155, the transmitted (or respectively reflected) guided mode of each sensor 1 of rank i of the first group has an intensity (or respectively) $I_{m,t}^i$, $I_{m,r}^i$. The transmitted (or respectively reflected) guided mode of each sensor 1 of rank i of the second group has an intensity $I_{r,t}^i$ (or respectively $I_{r,r}^i$).

An optional calibration phase can be established during which a number nc of fluids of interest with different complex refractive indices, called calibration fluids, are evaluated with the first group of sensors of the refractometer 10. There is then recorded, for each calibration fluid c ∈ {0.1, ..., n₀−1}, the intensity $I_{c,t}^i$ (or respectively $I_{c,r}^i$) of the transmitted (or respectively reflected) guided mode obtained at the output of the refractometer 155 with the calibration fluid c in a calibration library. The intensities $I_{c,t}^i$ and $I_{c,r}^i$ can also be obtained by simulation.

$(I_{c,t}^0, I_{c,t}^1, \ldots, I_{c,t}^{n-1})$ $(I_{m,t}^0, I_{m,t}^1, \ldots, I_{m,t}^{n-1})$, $(I_{r,t}^0, I_{r,t}^1, \ldots, I_{r,t}^{n-1})$ $(I_{c,r}^0, I_{c,r}^1, \ldots, I_{c,r}^{n-1})$, $(I_{m,r}^0, I_{m,r}^1, \ldots, I_{m,r}^{n-1})$, $(I_{r,r}^0, I_{r,r}^1, \ldots, I_{r,r}^{n-1})$, define, respectively, vectors $I_{c,t}, I_{m,t}, I_{r,t}, I_{c,r}, I_{m,r}, I_{r,r}$ and $\mathbb{R}^3$ Several methods can be used for determining the value of the complex optical index of the fluid of interest from the intensities $I_{m,t}^i$ and/or $I_{m,r}^i$. Only a few are described here.

Figure 6:
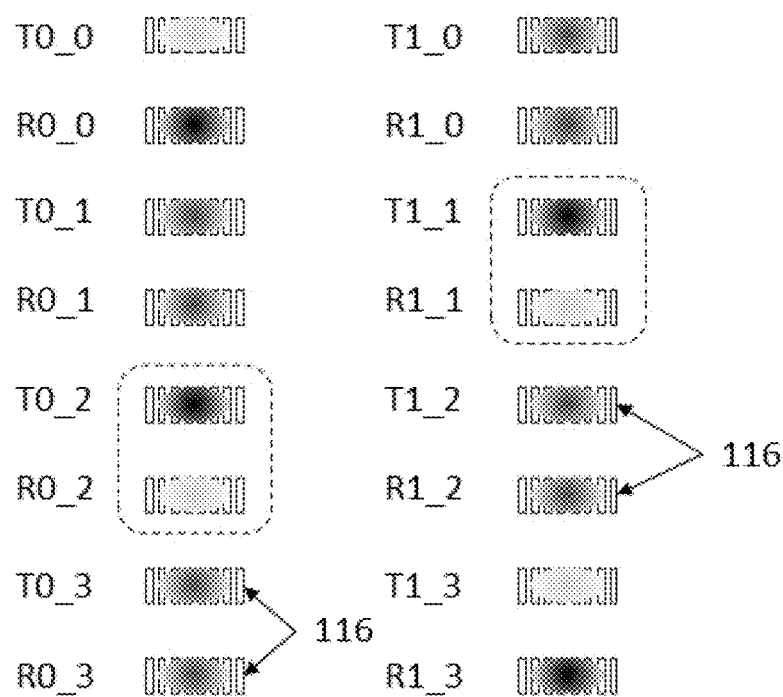
FIG. 6 is an example of an exit light flow of the example of a refractometer

According to one example of a method, in relation to FIG. 6, a comparison between firstly the $I_{m,t}^i$ and/or the $I_{m,r}^i$ and secondly the $I_{r,t}^i$ and/or the $I_{r,r}^i$ makes it possible to establish a difference between the complex optical index of the fluid of interest and the known one of the reference fluid, referring, for example, to a nomogram.

In FIG. 6, the output of the refractometer 155 comprises coupling gratings 116. The refractometer 10 includes here 4 sensors 1 in the first group of sensors and 4 sensors 1 in the second group. The transmission exit channels 152 are referenced Tj_i. "j" is equal to 0 if the exit channel 152 comes from a sensor 1 in the first group, and to 1 if the exit channel 152 comes from a sensor 1 in the second group. "i" is the rank of the sensor 1. Likewise, the reflection exit channels 152 are referenced Rj_i. "j" is equal to 0 if the exit channel 152 comes from a sensor 1 in the first group, and to 1 if the exit channel 152 comes from a sensor 1 in the second group. "i" is the rank of the sensor 1.

The extracted parts of the transmitted and reflected guided modes are shown in the form of ellipses, with a grey level that is darker, the greater the intensity. Here, the greatest intensity contrast between transmitted and reflected modes of one and the same sensor is marked for each group of sensors (rectangles in broken lines). The difference between the marking of the first group (sensor of rank 2) and the marking of the second group (sensor of rank 1) represents a difference between the refractive indices of the fluid of interest and of the reference fluid. The refractive index of the reference fluid being known, it is possible to determine the refractive index of the fluid of interest.

The marking of the intensity contrasts between transmitted and reflected modes can be done visually, on a digital image of the output of the refractometer 155 captured by an imager, or, if the light source emits a light visible to the naked eye, optionally by means of a microscope. The same method can be applied to the marking of an intensity maximum of the transmitted modes, or to an intensity minimum of the reflected modes.

Several refractometers 10 can be disposed on one and the same plate, in order to make measurements in parallel.

Particular embodiments have just been described. Different variants and modifications will appear to a person skilled in the art. For example, the sensors in the first group, and where applicable in the second group, can have identical Fabry-Pérot interferometers 120, the light source can be of the wide band type and the power divider 130 can be replaced by a wavelength demultiplexer on each of its exits.

The invention claimed is:

1. A sensor, including:
   a planar entry guide comprising a first exit face and a planar transmission exit guide comprising a second entry face,
   a Fabry-Pérot cavity configured to accommodate a fluid, and delimited by the first exit face of the planar entry guide and by the second entry face of the planar transmission exit guide,
   a planar reflection exit guide optically coupled to the planar entry guide by the Fabry-Pérot cavity, having an optical axis at the first face forming an acute opening angle with an optical axis at the first face of the planar entry guide,
   the Fabry-Pérot cavity being arranged so that a normal to the first face constitutes a bisector of the opening angle.

2. The sensor according to claim 1, wherein the planar transmission exit guide has an optical axis at the second face parallel to the optical axis of the planar entry guide.

3. The sensor according to claim 2, the optical axis of the planar transmission exit guide is contained in the open half-plane delimited by the optical axis of the planar entry guide that contains the planar reflection exit guide.

4. The sensor according to claim 1, wherein the planar transmission and reflection exit guides are each coupled to a coupling grating.

5. The sensor according to claim 1 further comprising an absorbent wall between the planar transmission and reflection exit guides.

6. The sensor according to claim 1, wherein the first and/or the second face incorporate a biorecognition element.

7. A refractometer including
a power divider, and
a first group of sensors according to claim 1, optically coupled to the power divider, such that at least one sensor of the first group has its opening angle or a width of the Fabry-Pérot cavity different respectively from the opening angle or from a width of the Fabry-Pérot cavity of another sensor of the first group.

8. The refractometer according to claim 7, wherein the sensors in the first group have equal opening angles, and different Fabry-Pérot cavity widths selected from an ordered set of distinct values.

9. The refractometer according to claim 7, wherein the sensors in the first group have Fabry-Pérot cavities with the same width, and different opening angles selected from an ordered set of distinct values.

10. The refractometer according to claim 7, further including a housing comprising a microfluidic channel of interest communicating with the Fabry-Pérot cavities of the sensors in the first group.

11. The refractometer according to claim 10, further comprising a second group of sensors optically coupled to the power divider, each sensor in the second group being identical to a sensor in the first group.

12. The refractometer according to claim 11, wherein the housing further comprises a reference microfluidic channel communicating with the Fabry-Pérot cavities of the sensors in the second group.

13. The refractometer according to claim 7, wherein the planar entry, transmission exit and reflection exit guides are made from a common material.

14. The refractometer according to claim 7, further comprising an exit channel optically coupled to each planar transmission exit guide and to each planar reflection exit guide, the exit channels having aligned ends.

15. A method for measuring a refractive index and/or an absorption of a fluid of interest comprising:
optically coupling a light source to an input of the power divider of a refractometer according to claim 7,
introducing the fluid into the Fabry-Pérot cavities of the sensors in the first group.

16. The method according to claim 15, wherein the sensors in the first group of the refractometer have Fabry-Pérot cavities with the same width, planar entry guides with the same width, and different opening angles selected from an ordered set of distinct values that at least partly covers the range between $1.8*\theta c$ and $2.0*\theta c$, where $\theta c$ is the minimum total reflection angle of the first faces of the planar entry guides.

17. The method according to claim 16, for which the width of the Fabry-Pérot cavities is such that a transmitted light flow coming from the light source has an intensity in a planar transmission exit guide of a sensor the opening angle of which is not equal to one of the bounds of the ordered set of values, strictly greater than its intensity in all the planar transmission exit guides of the other sensors.

18. The method according to claim 15, wherein the refractometer further comprises a second group of sensors optically coupled to the power divider, each sensor in the second group being identical to a sensor in the first group; wherein the refractometer further includes a housing comprising a microfluidic channel of interest communicating with the Fabry-Pérot cavities of the sensors in the first group and a reference microfluidic channel communicating with the Fabry-Pérot cavities of the sensors in the second group; comprising measuring the refractive index of the fluid of interest by noting a difference in the position of a maximum and/or minimum intensity or intensity contrast between the exit channels of the first group and the exit channels of the second group.

* * * * *